(12) United States Patent
Herron et al.

(10) Patent No.: US 6,231,287 B1
(45) Date of Patent: May 15, 2001

(54) ROTOR WINDAGE NUT

(75) Inventors: William Lee Herron, Greer, SC (US); Srihari Balasubramanian, Guilderland, NY (US); Horst Gunther DeLorenzi, Scotia, NY (US); Suryaprakash Ganti, Albany, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/514,741

(22) Filed: Feb. 28, 2000

(51) Int. Cl.[7] ................................................ F16B 37/06
(52) U.S. Cl. ...................... 411/427; 411/104; 416/198 A
(58) Field of Search ............................... 411/84, 103, 104, 411/427; 416/198 A

(56) References Cited

U.S. PATENT DOCUMENTS

| | | | |
|---|---|---|---|
| 1,865,346 | * | 6/1932 | Wells . |
| 2,575,237 | * | 11/1951 | Sollinger . |
| 3,632,228 | * | 1/1972 | Acres . |
| 4,245,959 | * | 1/1981 | Carreno . |
| 5,796,202 | * | 8/1998 | Herron . |

* cited by examiner

Primary Examiner—Flemming Saether
(74) Attorney, Agent, or Firm—Nixon & Vanderhye

(57) ABSTRACT

A rotor tie bolt nut includes a nut body having a threaded center hole therein; a first peripheral surface on one side of the center hole that spans the center hole and extends in opposite directions to define a pair of wing sections; and a pair of buttress sections supporting the wing sections; the buttress sections having second and third peripheral surfaces connected to opposite ends, respectively, of the first peripheral surface, and to each other by a radiused surface on an opposite side of the center hole.

18 Claims, 1 Drawing Sheet

ROTOR WINDAGE NUT

This invention relates to turbomachinery in general and, specifically, to a new design for nuts used with bolts that tie sections of a rotor or stator assembly together.

BACKGROUND OF THE INVENTION

Axially extending tie bolts are used in rotary machines, such as turbines used for power generation, to hold various components such as turbine stages, nozzles and spacers together on the core shaft of the rotor (or other components in the stator assembly). These bolts are typically circumferentially spaced about the rotor, with an annular rotor cavity or groove provided for accommodating the associated nuts.

The bolting that extends into cavities bounded by both rotor and stator components can significantly affect the flow of air in those cavities by pumping the air around the rotor circumference. This pumping action increases the air's tangential velocity if the bolts are on the rotor, and slows it down if the bolts are on the stator. Regardless of direction, the acceleration results in frictional heating of the gas, increasing its temperature as well as the temperature of adjacent components.

This so-called "windage" is undesirable, in that it uses energy from the machine thus reducing efficiency, and in that the increased component temperatures can limit part life. Several concepts have been developed to minimize windage by establishing a cover over the nuts and bolts, thus decreasing the pumping that will occur. The cover may be a separate piece, or it may be introduced by shaping the nut to present a segmented 360 degree surface to the cavity. This latter approach is used at one end of the rotor of certain of the assignee's land based gas turbines. More specifically, the nuts themselves form a part of the wall of the air cavity between the rotor and stator components. Each nut has a compound peripheral surface, a radially outer part of which conforms generally to the curvature of the rotor and which defines a pair of oppositely extending cantilevered "wings." A large hole in the center of the nut is threaded to receive the bolt in conventional fashion. Two smaller holes to either side of the central hole, i.e., below the "wings," are provided to reduce the weight of the nut. Even with this feature, however, each nut weighs slightly over 9.5 lbs.

The "wings" on the nut bridge the space between adjacent nuts, with the "wing tips" of adjacent nuts coming close to, but not contacting each other. Thus, the outer surfaces of the assembled nuts present a substantially continuous, smooth surface to the rotor-stator cavity of which they form a part of the cavity wall. The wall thickness of the nut varies in the different areas and this non-uniformity presents a variable stiffness, which in turn causes a circumferential variation in load transfer to the bolt. Similarly, the wings (that are essentially cantilevered from the sides of the nut) tend to put a tensile load into the sides and bottom of the nut, and a compressive load on the top of the nut, i.e., directly over the center hole.

BRIEF SUMMARY OF THE INVENTION

The present invention provides an improvement in the existing aft windage nut design. Specifically, the wing areas of the nut have been changed from a cantilevered design to a buttressed design, thus allowing a smoother, more uniform shape which, in turn, permits the various thicknesses to be more uniform as well. The thin buttresses more uniformly transfer the loading of the wings into the hoop direction of the nut, further enhancing load uniformity. The uniform wall thicknesses also reduce weight, resulting in a reduction of peak and average loads transferred to the bolt.

Stresses in the nut itself, which have been related to net section yielding, are also lowered. The reduced weight of the nut itself is permitted by more efficiently supporting the weight of the windage features of the nut, i.e., the wings.

Thus, the present invention relates to a rotor tie bolt nut comprising a nut body having a threaded center hole therein; a first peripheral surface on one side of the center hole that spans the center hole and extends in opposite directions to define a pair of wing sections; and a pair of buttress sections supporting the wing sections; the buttress sections having second and third peripheral surfaces connected to opposite ends, respectively, of the first peripheral surface, and to each other by a radiused surface on an opposite side of the center hole.

In another aspect, the invention provides, in a rotor body for rotating machinery where rotor components are held together by a plurality of axially extending bolts, each bolt having a nut threaded onto one end of the bolt; and wherein the rotor is formed with an annular cavity in which the plurality of bolts terminate and in which the plurality of nuts are located, each nut comprising a nut body having a threaded center hole therein; a first peripheral surface on one side of the center hole that spans the center hole and extends in opposite directions to define a pair of wing sections; and a pair of buttress sections supporting the wing sections; the buttress sections having second and third peripheral surfaces connected to opposite ends, respectively, of the first peripheral surface, and to each other by a radiused surface on an opposite side of the center hole.

DETAILED DESCRIPTION OF THE INVENTION

Figure 1:
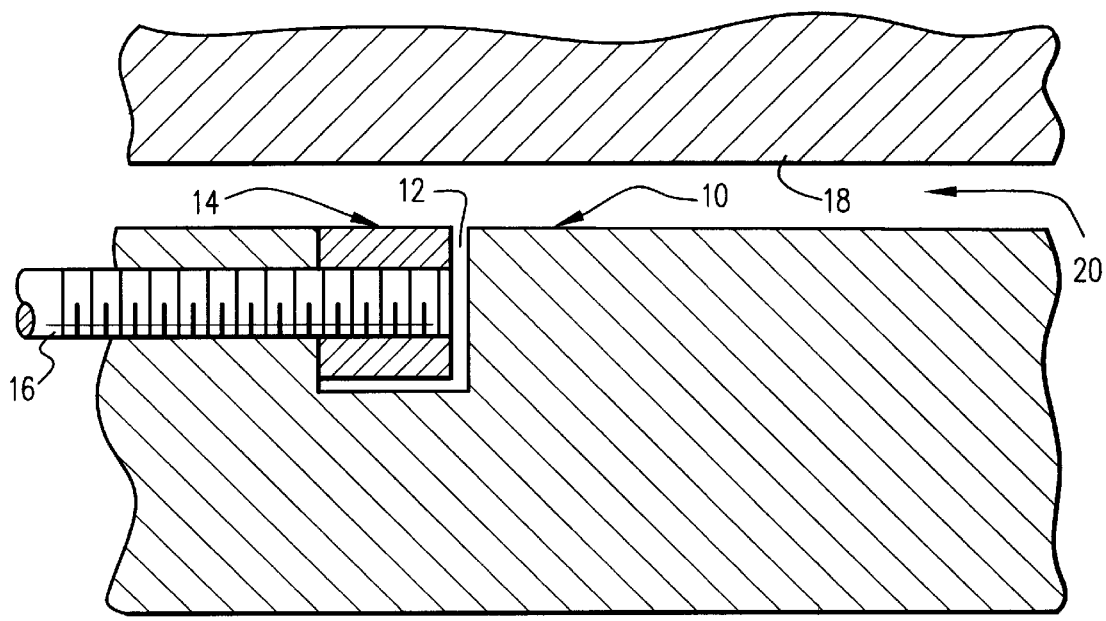
FIG. 1 is a partial cross section of a rotor and associated windage nut known in the art.

FIG. 1 partially illustrates a rotating machine rotor 10, which may be the rotor of a gas turbine, one part of which is formed with a peripheral annular groove 12 that accommodates a plurality of rotor windage nuts 14 arranged about the groove 12, and adapted to receive the threaded ends of a like plurality of tie bolts 16. A stator 18 is partially shown, and it will be appreciated that the stator 18 surrounds the rotor 10, with a radial gap 20 therebetween.

Figure 2:
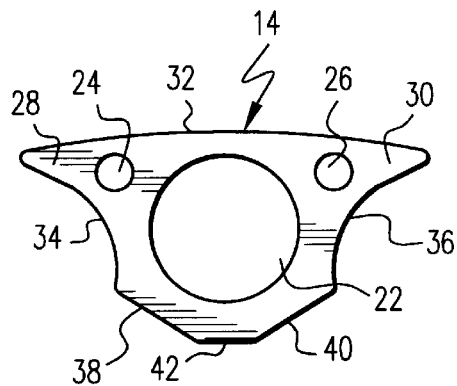
FIG. 2 is an end elevation of the nut shown in FIG. 1.

FIG. 2 shows the peripheral shape of a conventional rotor windage nut 14 that is formed with a center hole 22, the internal surface of which is threaded to receive the threaded end of the bolt 16. Two additional smaller holes 24 and 26 are provided in respective wing sections 28, 30, respectively, merely to reduce the overall weight of the nut It can be seen that the nut includes a first peripheral surface 32 that spans the center hole 22 and the wing sections 28, 30. Surface 32 has a curvature substantially the same as the curvature of the rotor 10. A plurality of similar windage nuts 14 are seated within the peripheral annular groove 12 in the rotor such that the curved surface portions 32 form a substantially continuous peripheral surface about the cavity or groove 12 to thus minimize the windage effect.

Each nut 14 is also provided with curved surfaces 34, 36 that cooperate with the surface portion 32 to form the opposite wing sections 28, 30. Interior surfaces 38 and 40 are connected by a bottom or root surface 42, thus completing the peripheral shape of the nut. It will be appreciated that the wing sections 28 and 30 are essentially cantilevered from the main portion of the nut. The disadvantages resulting from this arrangement and from this arrangement and from the evident non-uniformity in wall thicknesses have been described above.

Figure 3:
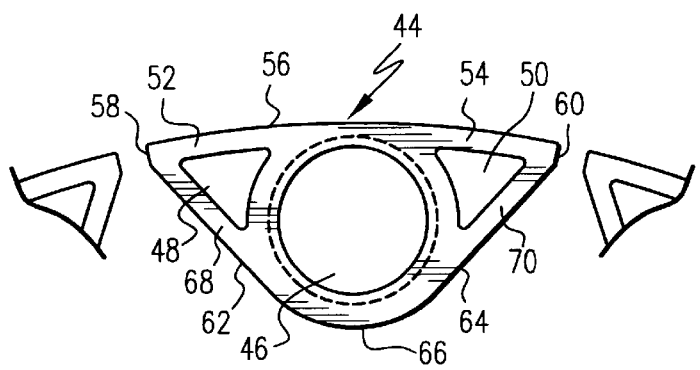
FIG. 3 is an end elevation of a windage nut in accordance with this invention.

Now turning to FIG. 3, a redesigned rotor tie bolt nut 44 in accordance with this invention is illustrated. Here again, there is a center hole 46, the internal surface of which is threaded to receive the threaded end of the bolt 16. Two generally triangular shaped holes 48 and 50 are provided within a pair of opposite wing sections 52, 54, respectively. A first or outer peripheral surface 56 of the nut is similar to surface 32 of the nut shown in FIG. 2, in that when a plurality of nuts 44 are aligned within the peripheral groove 12, like surfaces 56 form a substantially continuous peripheral surface about the rotor, as apparent from FIG. 3.

Opposite wing edge surfaces 58 and 60 merge into substantially straight second and third surfaces 62, 64, which merge at a radiused inner portion 66. It can be seen that with the redesign particularly of surfaces 62, 64 and 66, the wing sections 52 and 54 have been altered from a cantilevered arrangement to a buttress sections arrangement, with thin buttresses 68, 70 supporting the wing sections 52, 54. This, in turn, has allowed the various wall thicknesses within the nut to be substantially uniform, and the apertures 48 and 50 to be larger than those utilized in the prior rotor windage nut design. The thin buttresses 68, 70 efficiently transfer the loading of the wing sections 52, 54 into the hoop direction of the nut, further enhancing the load uniformity.

In an exemplary embodiment, the center hole diameter is 3.5 inches, the circumferential length of surface 56 is about 10 inches, and the wall thickness at any location is approximately 0.50 inch. The predicted weight of the tie bolt nut 44 is lowered to below 9 pounds, an approximate 6% reduction in weight as compared to the nut design shown in FIG. 2. As a result, the peak stresses are also lowered more than 6%. The effect of the redistribution of load is that the loading is more evenly distributed, not just circumferentially around the bolt, but also axially along the bolt. In fact, in one specific gas turbine design of the assignee of this invention, stress analyses have been conducted and have shown that the Von Mises stress value has been dropped from about 150 Ksi to about 140 Ksi.

In summary, the rotor tie bolt nut as described herein:
1. retains the windage feature capability of the nut;
2. lowers the net load to the bolt (by decreasing the nut weight);
3. lowers the peak load to the bolt (by creating a more uniform nut wall thickness);
4. lowers the net section stresses in the nut, to eliminate the non-axisymetric yielding that has been observed in field returned hardware; and
5. retains the pull test capability of the nut.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor tie bolt nut comprising a unitary nut body having a threaded center hole therein; a first peripheral surface on one side of said center hole that spans said center hole and extends in opposite directions to define a pair of wing sections; and a pair of buttress sections supporting said wing sections; said buttress sections having substantially straight second and third peripheral surfaces connected to opposite ends, respectively, of said first peripheral surface, and to each other by a radiused surface on an opposite side of said center hole.

2. The rotor tie bolt nut of claim 1 and further comprising a pair of apertures on opposite sides of said center hole.

3. The rotor tie bolt nut of claim 1 wherein said radiused surface has a curvature substantially parallel to a curvature of said center hole.

4. The rotor tie bolt nut of claim 1 wherein wall thicknesses in said nut are substantially uniform.

5. The rotor tie bolt nut of claim 4 wherein said wall thicknesses are about 0.50 inch.

6. The rotor tie bolt nut of claim 1 wherein said first peripheral surface is curved and has a length of about 10 inches.

7. The rotor tie bolt nut of claim 6 wherein said center hole has a diameter of about 3½ inches.

8. The rotor tie bolt nut of claim 1 wherein said nut is constructed of stainless steel.

9. A rotor tie bolt nut comprising a nut body having a threaded center hole therein; a first peripheral surface on one side of said center hole that spans said center hole and extends in opposite directions to define a pair of wing sections; and a pair of buttress sections supporting said wing sections; said buttress sections having second and third peripheral surfaces connected to opposite ends, respectively, of said first peripheral surface, and to each other by a radiused surface on an opposite side of said center hole; and further comprising a pair of apertures on opposite sides of said center hole; and wherein said pair of apertures are generally triangular in shape.

10. The rotor tie bolt nut of claim 4 wherein one side of each of said generally triangular apertures partially defines a respective one of said buttress sections.

11. In a rotor assembly for rotating machinery where rotor components are held together by a plurality of axially extending bolts, each bolt having a nut threaded onto one end of said bolt; and wherein said rotor is formed with an annular cavity in which said plurality of bolts terminate and in which said plurality of nuts are located, each nut comprising a unitary nut body having a threaded center hole therein; a first peripheral surface on one side of said center hole that spans said center hole and extends in opposite directions to define a pair of wing sections; and a pair of buttress sections supporting said wing sections; said buttress sections having second and third peripheral and substantially straight surfaces connected to opposite ends, respectively, of said first peripheral surface, and to each other by a radiused surface on an opposite side of said center hole.

12. The rotor assembly of claim 11 and further comprising a pair of apertures on opposite sides of said center hole.

13. The rotor assembly of claim 11 wherein said radiused surface has a curvature substantially parallel to a curvature of said center hole.

14. The rotor assembly of claim 11 wherein wall thicknesses in said nut are substantially uniform.

15. The rotor assembly of claim 11 wherein said first peripheral surface is curved and has a length of about 10 inches.

16. The rotor assembly of claim 15 wherein said center hole has a diameter of about 3½ inches.

17. In a rotor assembly for rotating machinery where rotor components are held together by a plurality of axially extending bolts, each bolt having a nut threaded onto one end of said bolt; and wherein said rotor is formed with an annular cavity in which said plurality of bolts terminate and in which said plurality of nuts are located, each nut comprising a nut body having a threaded center hole therein; a first peripheral surface on one side of said center hole that spans said center hole and extends in opposite directions to define a pair of wing sections; and a pair of buttress sections supporting said wing sections; said buttress sections having second and third peripheral surfaces connected to opposite ends, respectively, of said first peripheral surface, and to each other by a radiused surface on an opposite side of said center hole; and further comprising a pair of apertures on opposite sides of said center hole; and wherein said pair of apertures are generally triangular in shape.

18. The rotor assembly of claim 17 wherein one side of each of said generally triangular apertures partially defines a respective one of said buttress sections.

* * * * *

UNITED STATES PATENT AND TRADEMARK OFFICE
CERTIFICATE OF CORRECTION

PATENT NO.       : 6,231,287 B1                                            Page 1 of 1
APPLICATION NO.  : 09/514741
DATED            : May 15, 2001
INVENTOR(S)      : Herron et al.

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*